United States Patent
Kamada

(10) Patent No.: US 11,597,797 B2
(45) Date of Patent: *Mar. 7, 2023

(54) LIQUID BLEND FOR REACTION INJECTION MOLDING, METHOD FOR PRODUCING REACTION INJECTION MOLDED BODY, AND REACTION INJECTION MOLDED BODY

(71) Applicant: RIMTEC CORPORATION, Tokyo (JP)

(72) Inventor: Michiru Kamada, Tokyo (JP)

(73) Assignee: RIMTEC CORPORATION, Tokyo (JP)

( * ) Notice: Subject to any disclaimer, the term of this patent is extended or adjusted under 35 U.S.C. 154(b) by 894 days.

This patent is subject to a terminal disclaimer.

(21) Appl. No.: 16/405,159

(22) Filed: May 7, 2019

(65) Prior Publication Data

US 2019/0256648 A1 Aug. 22, 2019

Related U.S. Application Data

(63) Continuation-in-part of application No. 14/655,981, filed as application No. PCT/JP2013/083890 on Dec. 18, 2013, now abandoned.

(30) Foreign Application Priority Data

Dec. 27, 2012 (JP) .................................. 2012-285087

(51) Int. Cl.
*C08G 61/06* (2006.01)
*C08G 61/08* (2006.01)
*C08K 5/06* (2006.01)
*B29C 45/18* (2006.01)
*B29C 45/76* (2006.01)
*B29K 55/00* (2006.01)

(52) U.S. Cl.
CPC .......... *C08G 61/08* (2013.01); *B29C 45/1866* (2013.01); *B29C 45/762* (2013.01); *C08K 5/06* (2013.01); *B29K 2055/00* (2013.01); *C08G 2261/3324* (2013.01); *C08G 2261/418* (2013.01)

(58) Field of Classification Search
CPC ... C08G 61/06; C08G 61/08; C08G 2261/418
See application file for complete search history.

(56) References Cited

U.S. PATENT DOCUMENTS

| | | | |
|---|---|---|---|
| 4,918,138 A | 4/1990 | Hara et al. | |
| 5,068,296 A | 11/1991 | Hara et al. | |
| 5,268,232 A | 12/1993 | Khasat et al. | |
| 2017/0114160 A1* | 4/2017 | Kamada | .................. C08G 61/08 |

FOREIGN PATENT DOCUMENTS

| | | | | |
|---|---|---|---|---|
| JP | 4-279628 | A | 10/1992 | |
| JP | 2003-25364 | A | 1/2003 | |
| JP | 2003-26781 | A | 1/2003 | |
| JP | 2005-153265 | A | 6/2005 | |
| JP | 2008-163105 | A | 7/2008 | |
| JP | 2009-221402 | A | 10/2009 | |
| JP | 2010-254890 | A * | 11/2010 | ............. C08G 61/08 |
| JP | 2010-254980 | A * | 11/2010 | ............. C08G 61/08 |

(Continued)

OTHER PUBLICATIONS

JP 2010-254890 A (Nov. 11, 2010); Kamiya, Ikuyo et al.; machine translation. (Year: 2010).*

(Continued)

*Primary Examiner* — Rip A Lee
(74) *Attorney, Agent, or Firm* — WHDA, LLP

(57) ABSTRACT

The present invention provides: a reaction injection molding liquid mixture comprising a norbornene-based monomer, a metathesis polymerization catalyst that includes tungsten as a center metal, an activator, and an ether compound represented by a formula (1), wherein $R^1$ to $R^4$ are independently an alkyl group having 1 to 6 carbon atoms, the reaction injection molding liquid mixture comprising the activator and the ether compound in a molar ratio (ether compound/activator) of 0.7/1 to 30/1; a method for producing a reaction injection molded product comprising a reaction injection molding step that includes subjecting the reaction injection molding liquid mixture according to any one of claims 1 to 4 to bulk polymerization inside a mold; a reaction injection molded product obtained using the method for producing a reaction injection molded product. Consequently, the present invention provides: a reaction injection molding liquid mixture that makes it possible to obtain a reaction injection molded product that has an excellent surface (surface state) and exhibits excellent strength while preventing a situation in which the resin remains on the surface of the mold when the resin is removed from the mold, a method for producing a reaction injection molded product using the same, and a reaction injection molded product obtained using the method.

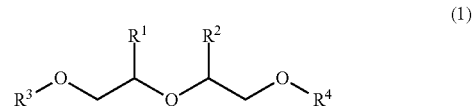

(1)

6 Claims, No Drawings

(56) References Cited

FOREIGN PATENT DOCUMENTS

| | | |
|---|---|---|
| JP | 2011-26588 A | 2/2011 |
| JP | 2011-122117 A | 6/2011 |
| RU | 2450028 C2 | 5/2012 |
| WO | 97/26291 A1 | 7/1997 |
| WO | 2014/103830 A1 | 7/2014 |

OTHER PUBLICATIONS

International Search Report dated Mar. 18, 2014, issued in corresponding application No. PCT/JP2013/083890 (2 pages).

Seihin Shosai Joho, "1.0mol/l Triisobutylaluminium Toluene Solution", Wako Pure Chemical Industries, Ltd., (http://www.siyaku.com/uh/Shs.do?dspCode=W01W0120-1384), cited in the ISR. (1 page).

Extended (Supplementary) European Search Report date Sep. 7, 2016, issued in counterpart European Patent Application No. 13866947.8. (4 pages).

International Search Report dated Sep. 8, 2015, issued in counterpart International Application No. PCT/JP2015/067755 (1 page).

Translation of Written Opinion dated Sep. 8, 2015, issued in counterpart International Application No. PCT/JP2015/067755 (6 pages).

Extended (supplementary) European Search Report dated Jan. 22, 2018, issued in counterpart European Application No. 15812526.0 (7 pages).

Non-Final Office Action dated Dec. 29, 2017, issued in U.S. Appl. No. 15/319,059. (19 pages).

Non-Final Office Action dated Jun. 2, 2017, issued in U.S. Appl. No. 14/655,981. (18 pages).

Office Action dated Oct. 4, 2018, issued in Russian application No. 2017102308/04(004069), with English translation. (13 pages).

Office Action dated Dec. 12, 2019, issued in EP Application No. 15 812 526.0. (5 pages).

Office Action dated Dec. 26, 2019, issued in IN Application No. 201747002198, with English translation. (8 pages).

Office Action dated Mar. 31, 2020, issued in BR Application No. BR112016028156-0, with Informal English Translation. (6 pages).

Office Action dated Apr. 16, 2021, issued in CA Application No. 2,951,820. (3 pages).

Final Office Action dated May 1, 2019, issued in U.S. Appl. No. 15/319,059.

Non-Final Office Action dated Oct. 4, 2019, issued in U.S. Appl. No. 15/319,059.

Non-Final Office Action dated Jan. 10, 2019, issued in U.S. Appl. No. 14/655,981.

Non-Final Office Action dated Jan. 25, 2021, issued in U.S. Appl. No. 16/728,549.

Notice of Allowance dated May 26, 2021, issued in U.S. Appl. No. 16/728,549.

\* cited by examiner

LIQUID BLEND FOR REACTION INJECTION MOLDING, METHOD FOR PRODUCING REACTION INJECTION MOLDED BODY, AND REACTION INJECTION MOLDED BODY

CROSS-REFERENCE TO RELATED APPLICATIONS

This application is a Continuation In Part of U.S. application Ser. No. 14/655,981 filed on Jun. 26, 2015, which is now abandoned and which is a National Stage application filed under 35 U.S.C. § 371 of Application No. PCT/JP2013/083890, filed on Dec. 18, 2013, and which claims the benefit of priority under 35 U.S.C. § 119(a) of Japanese Patent Application No. 2012-285087, filed on Dec. 27, 2012, the entire contents of which are incorporated herein by reference.

TECHNICAL FIELD

The present invention relates to a reaction injection molding liquid mixture that includes a norbornene-based monomer, a method for producing a reaction injection molded product (article) using the reaction injection molding liquid mixture, and a reaction injection molded product (article) obtained using the method for producing a reaction injection molded product.

BACKGROUND ART

A reaction injection molding (RIM) method has been known that injects a reaction mixture that includes a norbornene-based monomer and a metathesis polymerization catalyst into a mold, and subjects the reaction mixture to bulk ring-opening polymerization to produce a resin molded product (reaction injection molded product) formed of a norbornene-based resin.

For example, Patent Document 1 discloses a technique that subjects a reaction injection molding liquid mixture that includes a norbornene-based monomer and a specific elastomer to bulk ring-opening polymerization using the RIM method to obtain a resin molded product having a surface for which occurrence of a sink mark is suppressed irrespective of the shape and the size of the mold.

Patent Document 2 discloses a method for producing a resin molded product that subjects a novel metathesis-polymerizable monomer that includes 3-100 mass % of exo-dicyclopentadiene obtained by isomerizing of industrial available dicyclopentadiene to bulk ring-opening polymerization using the RIM method to obtain a crosslinked polymer molded product that has a low monomer residual ratio and has been sufficiently cured.

Patent Document 2 states that the storage stability of the reactive solution used to produce the resin molded product is improved by adding an ether compound to the reactive solution. Patent Document 3 (that discloses a method for producing a cycloolefin-based ring-opening polymer by solution polymerization without using the RIM method) states that a specific ether compound may function as a reaction modifier.

RELATED-ART DOCUMENT

Patent Document

Patent Document 1: JP-A-2008-163105
Patent Document 2: JP-A-2003-25364
Patent Document 3: JP-A-2010-254980

SUMMARY OF THE INVENTION

Technical Problem

The inventor of the invention conducted studies regarding the inventions disclosed in Patent Documents 1 and 2 with the aim to develop a technique that can improve the surface state of a resin molded product obtained using the RIM method. As a result, the inventor found that the resin may remain on the surface of the mold, and the surface of the resin molded product may be roughened when removing the resin molded product from the mold.

An object of the invention is to provide a reaction injection molding liquid mixture that makes it possible to obtain a reaction injection molded product that has an excellent surface (surface state) and exhibits excellent strength while preventing a situation in which the resin remains on the surface of the mold when the resin is removed from the mold, a method for producing a reaction injection molded product using the reaction injection molding liquid mixture, and a reaction injection molded product obtained using the method for producing a reaction injection molded product.

Solution to Problem

The inventor conducted extensive studies with the aim to develop a novel reaction injection molding liquid mixture in order to solve the above problem. As a result, the inventor found that the above problem can be solved by a reaction injection molding liquid mixture that includes a norbornene-based monomer, a metathesis polymerization catalyst that includes tungsten as the center metal, an activator, and an ether compound represented by the following formula (1), the reaction injection molding liquid mixture including the activator and the ether compound in a specific ratio. This finding has led to the completion of the invention.

Several aspects of the invention provide the following reaction injection molding liquid mixture (see [1] to [4]), method for producing a reaction injection molded product (see [5]), and reaction injection molded product (see [6]).

[1] A reaction injection molding liquid mixture including a norbornene-based monomer, a metathesis polymerization catalyst that includes tungsten as the center metal, an activator, and an ether compound represented by the following formula (1),

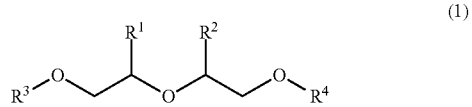

wherein $R^1$ to $R^4$ are independently an alkyl group having 1 to 6 carbon atoms, the reaction injection molding liquid mixture including the activator and the ether compound in a molar ratio (ether compound/activator) of 0.7/1 to 30/1.

[2] The reaction injection molding liquid mixture according to [1], wherein the ether compound represented by the formula (1) is a compound represented by the following formula (1-1),

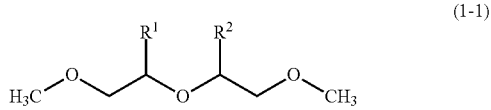

(1-1)

wherein R[1] and R[2] are independently an alkyl group having 1 to 6 carbon atoms.

[3] The reaction injection molding liquid mixture according to [1], wherein the ether compound represented by the formula (1) is dipropylene glycol dimethyl ether.

[4] The reaction injection molding liquid mixture according to [1], the reaction injection molding liquid mixture being a two-liquid-type liquid mixture that includes a liquid A that includes the activator, and a liquid B that includes the metathesis polymerization catalyst that includes tungsten as the center metal, wherein the norbornene-based monomer and the ether compound represented by the formula (1) are respectively included in either or both of the liquid A and the liquid B.

[5] A method for producing a reaction injection molded product including a reaction injection molding step that includes subjecting the reaction injection molding liquid mixture according to any one of [1] to [4] to bulk polymerization inside a mold.

[6] A reaction injection molded product obtained using the method for producing a reaction injection molded product according to [5].

Advantageous Effects of the Invention

The aspects of the invention thus make it possible to efficiently produce a reaction injection molded product that has an excellent surface and exhibits excellent strength while preventing a situation in which the resin remains on the surface of the mold when the resin is removed from the mold.

DESCRIPTION OF EMBODIMENTS

A reaction injection molding liquid mixture, a method for producing a reaction injection molded product, and a reaction injection molded product according to the embodiments of the invention are described in detail below.

1) Reaction Injection Molding Liquid Mixture

A reaction injection molding liquid mixture according to one embodiment of the invention includes (a) a norbornene-based monomer, (b) a metathesis polymerization catalyst that includes tungsten as the center metal, (c) an activator, and (d) an ether compound represented by the formula (1), the reaction injection molding liquid mixture including the activator and the ether compound in a molar ratio (ether compound/activator) of 0.7/1 to 30/1.

The reaction injection molding liquid mixture according to one embodiment of the invention is a liquid mixture that is used to produce a norbornene-based resin molded product by subjecting the norbornene-based monomer to bulk polymerization inside a mold.

(a) Norbornene-Based Monomer

The norbornene-based monomer used in connection with one embodiment of the invention is a compound that has the norbornene structure represented by the following formula (2).

(2)

Examples of the norbornene-based monomer include a norbornene-based monomer that does not include a ring that is fused with the norbornene ring in the molecule, a polycyclic norbornene-based monomer that includes three or more rings, and the like. These norbornene-based monomers may be used either alone or in combination.

The present invention provides a technique that can improve the surface state of a resin molded product obtained using the RIM method in normal work. Usually, industrial available norbornene-based monomer is used as a norbornene-based monomer. For example, dicyclopentadiene has two stereoisomers of endo-dicyclopentadiene and exo-dicyclopentadiene as disclosed in Patent Document 2. Among them, the main component of the commercially available dicyclopentadiene is endo-dicyclopentadiene, and the content of exo-dicyclopentadiene in the commercially available dicyclopentadiene is about 0-2 mass %. Accordingly, use of "a norbornene-based monomer, excluding those containing 3 mass % or more and 100 mass % or less of exo-dicyclopentadiene" is preferable in the present invention.

Specific examples of the norbornene-based monomer that does not include a ring that is fused with the norbornene ring in the molecule, include unsubstituted norbornene and a norbornene derivative that is substituted with an alkyl group, such as norbornene, 5-methylnorbornene, 5-ethylnorbornene, 5-butylnorbornene, 5-hexylnorbornene, 5-decylnorbornene, 5-cyclohexylnorbornene, and 5-cyclopentylnorbornene; a norbornene derivative that is substituted with an alkenyl group, such as 5-ethylidenenorbornene, 5-vinylnorbornene, 5-propenylnorbornene, 5-cyclohexenylnorbornene, and 5-cyclopentenylnorbornene; a norbornene derivative that is substituted with an aromatic ring, such as 5-phenylnorbornene; a norbornene derivative that is substituted with a polar group that includes an oxygen atom, such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methyl propionate, norbornenyl-2-methyl octanate, 5-hydroxymethylnorbornene, 5,6-di(hydroxymethyl)norbornene, 5,5-di(hydroxymethyl)norbornene, 5-hydroxy-i-propylnorbornene, 5,6-dicarboxynorbornene, and 5-methoxycarbonyl-6-carboxynorbornene; a norbornene derivative that is substituted with a polar group that includes a nitrogen atom, such as 5-cyanonorbornene; and the like.

The term "polycyclic norbornene-based monomer that includes three or more rings" used herein refers to a norbornene-based monomer that includes a norbornene ring and one or more rings that are fused with the norbornene ring in the molecule. Specific examples of the polycyclic norbornene-based monomer that includes three or more rings include a monomer represented by the following formula (3) and a monomer represented by the following formula (4).

(3)

wherein $R^5$ to $R^8$ are independently a hydrogen atom, a halogen atom, a substituted or unsubstituted hydrocarbon group having 1 to 20 carbon atoms, or a substituent that includes a silicon atom, an oxygen atom, or a nitrogen atom, provided that $R^6$ and $R^7$ are bonded to each other to form a ring.

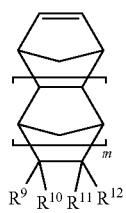

(4)

wherein $R^9$ to $R^{12}$ are independently a hydrogen atom, a halogen atom, a substituted or unsubstituted hydrocarbon group having 1 to 20 carbon atoms, or a substituent that includes a silicon atom, an oxygen atom, or a nitrogen atom, provided that $R^9$ and $R^{10}$ or $R^{10}$ and $R^{12}$ are optionally bonded to each other to form a ring, and m is 1 or 2.

Examples of the monomer represented by the formula (3) include dicyclopentadiene, methyldicyclopentadiene, tricyclo[5.2.1.0$^{2,6}$]dec-8-ene, tetracyclo[9.2.1.0$^{2,10}$.0$^{3,8}$]tetradeca-3,5,7,12-tetraene (also referred to as 1,4-methano-1,4,4a,9a-tetrahydro-9H-fluorene), tetracyclo[10.2.1.0$^{2,11}$.0$^{4,9}$]pentadeca-4,6,8,13-tetraene (also referred to as 1,4-methano-1,4,4a,9,9a,10-hexahydroanthracene), and the like.

Examples of the monomer represented by the formula (4) include tricyclopentadiene (m=1); tetracyclododecene and derivatives thereof (m=1); and hexacycloheptadecene and derivatives thereof (m=2).

Specific examples of tetracyclododecene and derivatives thereof include unsubstituted tetracyclododecene and a tetracyclododecene derivative that is substituted with an alkyl group, such as tetracyclododecene, 8-methyltetracyclododecene, 8-ethyltetracyclododecene, 8-cyclohexyltetracyclododecene, and 8-cyclopentyltetracyclododecene; a tetracyclododecene derivative that includes a double bond outside the ring, such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; a tetracyclododecene derivative that is substituted with an aromatic ring, such as 8-phenyltetracyclododecene; a tetracyclododecene derivative that is substituted with a substituent that includes an oxygen atom, such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic anhydride; a tetracyclododecene derivative that is substituted with a substituent that includes a nitrogen atom, such as 8-cyanotetracyclododecene and tetracyclododecene-8,9-dicarboxylic acid imide; a tetracyclododecene derivative that is substituted with a substituent that includes a halogen atom, such as 8-chlorotetracyclododecene; a tetracyclododecene derivative that is substituted with a substituent that includes a silicon atom, such as 8-trimethoxysilyltetracyclododecene; and the like.

Specific examples of hexacycloheptadecene and derivatives thereof include unsubstituted hexacycloheptadecene and a hexacycloheptadecene derivative that is substituted with an alkyl group, such as hexacycloheptadecene, 12-methylhexacycloheptadecene, 12-ethylhexacycloheptadecene, 12-cyclohexylhexacycloheptadecene, and 12-cyclopentylhexacycloheptadecene; a hexacycloheptadecene derivative that includes a double bond outside the ring, such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; a hexacycloheptadecene derivative that is substituted with an aromatic ring, such as 12-phenylhexacycloheptadecene; a hexacycloheptadecene derivative that is substituted with a substituent that includes an oxygen atom, such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid, and hexacycloheptadecene-12,13-dicarboxylic anhydride; a hexacycloheptadecene derivative that is substituted with a substituent that includes a nitrogen atom, such as 12-cyanohexacycloheptadecene and hexacycloheptadecene-12,13-dicarboxylic acid imide; a hexacycloheptadecene derivative that is substituted with a substituent that includes a halogen atom, such as 12-chlorohexacycloheptadecene; a hexacycloheptadecene derivative that is substituted with a substituent that includes a silicon atom, such as 12-trimethoxysilylhexacycloheptadecene; and the like.

These norbornene-based monomers may be used either alone or in combination.

Among these norbornene-based monomers, a polycyclic norbornene-based monomer that includes three or more rings is preferable, and a tricyclic, tetracyclic, or pentacyclic norbornene-based monomer is more preferable, since such a norbornene-based monomer is readily available and exhibits excellent reactivity, and it is possible to obtain a resin molded product that exhibits excellent heat resistance.

It is preferable to use a crosslinkable norbornene-based monomer that includes two or more reactive double bonds (i.e., a norbornene-based monomer that produces a ring-opening polymer that includes a double bond that exhibits crosslinking reactivity) (e.g., symmetrical cyclopentadiene trimer) and an additional norbornene-based monomer (i.e., a norbornene-based monomer that produces a ring-opening polymer that does not include a double bond that exhibits crosslinking reactivity) in combination when it is desired to obtain a thermosetting ring-opening polymer. The crosslinkable norbornene-based monomer is preferably used in a ratio of 2 to 30 mass % based on the total amount of the norbornene-based monomers.

A monomer that can undergo ring-opening copolymerization with the norbornene-based monomer may also be used as long as the advantageous effects (object) of the invention are not impaired. Examples of such a monomer include a monocyclic cycloolefin such as cyclobutene, cyclopentene, cyclopentadiene, cyclooctene, and cyclododecene, and the like. The monomer that can undergo ring-opening copolymerization with the norbornene-based monomer is preferably used in a ratio of 10 mass % or less, and more preferably 5 mass % or less, based on the total amount of the norbornene-based monomer(s).

(b) Metathesis Polymerization Catalyst that Includes Tungsten as Center Metal

In one embodiment of the invention, the metathesis polymerization catalyst that includes tungsten as the center metal (hereinafter may be referred to as "metathesis polymerization catalyst (b)") is used as the polymerization catalyst.

The metathesis polymerization catalyst (b) is not particularly limited as long as the metathesis polymerization catalyst (b) includes tungsten as the center metal, and can cause the norbornene-based monomer to undergo ring-opening polymerization. Only one type of the metathesis polymerization catalyst (b) may be used, or two or more types of the metathesis polymerization catalyst (b) may be used in combination.

The metathesis polymerization catalyst (b) is a complex in which a plurality of ions, atoms, polyatomic ions, and/or compounds are bonded to the tungsten atom (i.e., center atom). Examples of the metathesis polymerization catalyst (b) include a tungsten halide such as $WCl_6$, $WCl_5$, $WCl_4$, $WCl_2$, $WBr_6$, $WBr_4$, $WBr_2$, $WF_6$, $WF_4$, $WI_6$, and $WI_4$; a tungsten oxyhalide such as $WOCl_4$, $WOBr_4$, $WOF_4$, $WCl_2(OC_6H_5)_4$, and $W(OC_2H_5)_2Cl_3$; a metal oxide such as tungsten oxide; an organotungsten compound such as $(CO)_5WC(OCH_3)(CH_3)$, $(CO)_5WC(OC_2H_5)(CH_3)$, $(CO)_5WC(OC_2H_5)$, $W(OC_6H_5)_6$, and $W(CO)_3.(CH_3CN)_3$; a tungsten alkylidene compound such as $W(N-2,6-C_6H_3Pr^i_2)(CHBu^t)(OCMe_2CF_3)_2$, $W(N-2,6-C_6H_3Pr^i_2)(CHBu^t)(OCMe_2CF_3)_2)_2)$, $W(N-2,6-C_6H_3Pr^i_2)(CHCMe_2Ph)(OBu^t)_2$, $W(N-2,6-C_6H_3Pr^i_2)(CHCMe_2Ph)(OCMe_2CF_3)_2$, and $W(N-2,6-C_6H_3Pr^i_2)(CHCMe_2Ph)(OCMe_2CF_3)_2)_2)$ (wherein $Pr^i$ is an i-propyl group, $Bu^t$ is a t-butyl group, Me is a methyl group, and Ph is a phenyl group); and the like.

Among these, a tungsten halide and a tungsten oxyhalide are preferable, and $WCl_6$ and $WOCl_4$ are more preferable.

The metathesis polymerization catalyst (b) is normally used in an amount of 0.01 to 50 mmol, and preferably 0.1 to 20 mmol, based on 1 mol of the norbornene-based monomer (1 mol of two or more norbornene-based monomers in total when two or more norbornene-based monomers are used). If the amount of the metathesis polymerization catalyst is too small, the reaction may take time due to too low polymerization activity, and the production efficiency may deteriorate. If the amount of the metathesis polymerization catalyst is too large, a curing reaction may occur before the mold is sufficiently filled with the liquid mixture due to occurrence of an intense reaction. Moreover, crystals of the polymerization catalyst may precipitate in the liquid mixture, and it may be difficult to store the liquid mixture in a homogeneous state.

If the metathesis polymerization catalyst (b) is added directly to the norbornene-based monomer, the norbornene-based monomer may be polymerized immediately. Therefore, it is preferable to suspend the metathesis polymerization catalyst (b) in an inert solvent (e.g., benzene, toluene, or chlorobenzene) in advance, and add a small amount of an alcohol-based compound and/or a phenol-based compound to the suspension to effect dissolution before use. Examples of the alcohol-based compound include ethanol, 1-propanol, 2-propanol, 1-butanol, 2-butanol, t-butanol, and the like. Examples of the phenol-based compound include t-butylphenol, t-octylphenol, nonylphenol, dodecylphenol, and the like.

It may be possible to prevent unnecessary polymerization by adding a Lewis base or a chelating agent in an amount of about 1 to 5 mol based on 1 mol of the metathesis polymerization catalyst (b). Examples of the Lewis base and the chelating agent include acetylacetone, an alkyl acetoacetate, tetrahydrofuran, benzonitrile, and the like.

(c) Activator

The activator (hereinafter may be referred to as "activator (c)") is also referred to as a cocatalyst, and is added in order to improve the polymerization activity of the metathesis polymerization catalyst (b).

The activator (c) is not particularly limited. Examples of the activator (c) include organometallic compounds of the Group 11 to 14 metals in the periodic table, and the like. Specific examples of the activator (c) include an alkylaluminum compound such as triethylaluminum, triisobutylaluminum, trimethylaluminum, tributylaluminum, trihexylaluminium, and trioctylaluminum; an alkylaluminum halide compound such as ethylaluminum dichloride, diethylaluminum chloride, diisobutylaluminum chloride, ethylaluminum sesquichloride, isobutylaluminum dichloride, and dioctylaluminum iodide; an alkylaluminum alkoxide compound such as diethylaluminum ethoxide; an organotin compound such as tetrabutyltin; an organozinc compound such as diethylzinc; and the like.

Among these, an alkylaluminum compound and an alkylaluminum halide compound are preferable, and triethylaluminum, trioctylaluminum, diethylaluminum chloride, and dioctylaluminum iodide are more preferable. These activators (c) may be used either alone or in combination.

The activator (c) may be used in an arbitrary amount. The activator (c) is normally used in an amount of 0.1 to 100 mol, and preferably 1 to 10 mol, based on 1 mol of the metathesis polymerization catalyst (b). If the amount of the activator (c) is too small, the reaction may take time due to too low polymerization activity, and the production efficiency may deteriorate. If the amount of the activator (c) is too large, a curing reaction may occur before the mold is sufficiently filled with the reaction injection molding liquid mixture due to occurrence of an intense reaction.

(d) Ether Compound Represented by Formula (1)

The reaction injection molding liquid mixture according to one embodiment of the invention includes the ether compound represented by the following formula (1) (hereinafter may be referred to as "compound (d)").

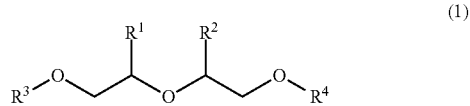

(1)

The reaction injection molding liquid mixture according to one embodiment of the invention includes the compound (d) so that the molar ratio (compound (d)/activator (c)) of the compound (d) to the activator (c) is 0.7/1 to 30/1. The details of the action mechanism of the compound (d) are unclear. When the reaction injection molding liquid mixture according to one embodiment of the invention includes the compound (d) so that the molar ratio (compound (d)/activator (c)) is within the above range, it is possible to produce a reaction injection molded product that has an excellent surface and exhibits excellent strength using the reaction injection molding liquid mixture according to one embodiment of the invention while preventing a situation in which the resin remains on the surface of the mold when the resin is removed from the mold. If the molar ratio (compound (d)/activator (c)) is less than 0.7/1, non-uniform gelation may occur during molding, and the resulting molded product may have an uneven surface. If the molar ratio (compound (d)/activator (c)) exceeds 30/1, the resulting molded product may have a sticky surface, and the resin may remain on the surface of the mold. In this case, it may be difficult to obtain the desired reaction injection molded product. Specifically, the advantageous effects of the invention are not obtained by merely suppressing the polymerization reactivity of the reaction injection molding liquid mixture, and are remarkably beneficial effects that cannot be expected from related art. The molar ratio (compound (d)/activator (c)) is preferably 1/1 to 20/1, and more preferably 2/1 to 10/1, from the viewpoint of improving the advantageous effects of the invention.

$R^1$ to $R^4$ in the formula (1) are independently an alkyl group having 1 to 6 carbon atoms. Examples of the alkyl group having 1 to 6 carbon atoms include a methyl group, an ethyl group, an isopropyl group, an n-propyl group, an isobutyl group, a sec-butyl group, a t-butyl group, an n-butyl group, an n-pentyl group, an n-hexyl group, and the like.

Specific examples of the compound (d) include the compounds respectively represented by the following formulas.

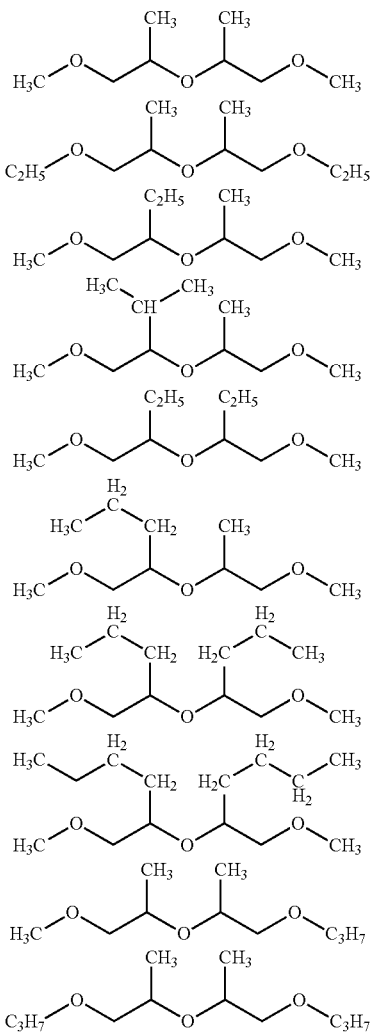

A compound represented by the following formula (1-1) is preferable as the compound (d) from the viewpoint of improving the advantageous effects of the invention.

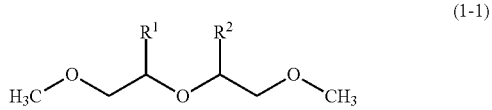

wherein $R^1$ and $R^2$ are the same as defined above. The compound represented by the formula (1-1) in which $R^1$ and $R^2$ are an alkyl group having 1 to 3 carbon atoms is more preferable, and the compound represented by the formula (1-1) in which $R^1$ and $R^2$ are a methyl group (i.e., dipropylene glycol dimethyl ether) is particularly preferable.

Note that the ether compound represented by the formula (1) may include an asymmetric carbon atom. The steric configuration thereof is not particularly limited.

Many of the compounds (d) are known compounds, and may be produced using a known method. A commercially available product may be used as the compound (d) either directly or after optional purification. These compounds (d) may be used either alone or in combination.

(e) Additional Component

An additional component may optionally be added to the reaction injection molding liquid mixture according to one embodiment of the invention in order to more efficiently produce the resin molded product, or improve or maintain the properties of the resin molded product.

Examples of the additional component include a polymerization promoter, an elastomer, a filler, a reinforcing material, an antioxidant, a thermal stabilizer, a light stabilizer, a UV absorber, a pigment, a colorant, a blowing agent, an antistatic agent, a flame retardant, a lubricant, a softener, a tackifier, a plasticizer, a release agent, a deodorant, an essence, a dicyclopentadiene-based thermally polymerizable resin, a hydrogenated product thereof, and the like.

The polymerization promoter is added to the reaction injection molding liquid mixture in order to improve the conversion ratio of the monomer into a polymer. A chlorine atom-containing compound is preferable as the polymerization promoter, and an organochlorine compound and a silicon chloride compound are more preferable as the polymerization promoter. Specific examples of the polymerization promoter include 2-chlorobenzotrichloride, 2,4-dichlorobenzotrichloride, hexachloro-p-xylene, 2,4-dichlorotrichlorotoluene, silicon tetrachloride, and the like.

The polymerization promoter is normally added in a ratio of 10 mass ppm to 10 mass % based on the total amount of the liquid mixture.

The elastomer is added to the reaction injection molding liquid mixture in order to provide the liquid mixture with fluidity and obtain a molded product for which occurrence of a sink mark is suppressed. It is preferable to use an elastomer having a shear rate coefficient of 1.30 to 1.60 as the elastomer. Note that the term "shear rate coefficient" used herein refers to a value that is calculated using the method described in Patent Document 1.

Examples of the elastomer include natural rubber, polybutadiene, polyisoprene, a styrene-butadiene copolymer (SBR), a styrene-butadiene-styrene block copolymer (SBS), a styrene-isoprene-styrene copolymer (SIS), an ethylene-propylene-diene terpolymer (EPDM), an ethylene-vinyl acetate copolymer (EVA), hydrogenated products thereof, and the like.

The elastomer is preferably used in an amount of 0.5 to 20 parts by mass, and more preferably 2 to 10 parts by mass, based on 100 parts by mass of the norbornene-based monomer.

The filler is not particularly limited. It is preferable to use an inorganic filler that includes a fibrous filler that normally has an aspect ratio of 5 to 100 (preferably 10 to 50), and a particulate filler that normally has an aspect ratio of 1 to 2 (preferably 1 to 1.5). Note that the aspect ratio of the filler refers to the ratio of the average major axis diameter to the 50% volume cumulative diameter of the filler. The term "average major axis diameter" used herein refers to the number average major axis diameter that is determined by measuring the major axis diameter of one hundred fillers that are randomly selected from an optical micrograph, and calculating the arithmetic average value thereof. The term "50% volume cumulative diameter" used herein refers to a value that is determined by measuring the particle size distribution using an X-ray transmission method.

The mass ratio (fibrous filler/particulate filler) of the fibrous filler to the particulate filler included in the inorganic filler is preferably 95/5 to 55/45, and more preferably 80/20 to 60/40. When the mass ratio of the fibrous filler to the particulate filler is within the above range, it is possible to obtain a molded product that exhibits excellent rigidity and excellent dimensional stability.

The 50% volume cumulative diameter of the fibrous filler is preferably 0.1 to 50 μm, and more preferably 1 to 30 μm. If the 50% volume cumulative diameter of the fibrous filler is too small, the resulting molded product may exhibit insufficient rigidity and dimensional stability. If the 50% volume cumulative diameter of the fibrous filler is too large, the polymer solution may precipitate in the tank or the pipe, or the injection nozzle may be clogged when injecting the polymer solution into the mold.

Examples of the fibrous filler include glass fibers, wollastonite, potassium titanate, zonolite, basic magnesium sulfate, aluminum borate, tetrapod-type zinc oxide, gypsum fibers, phosphate fibers, alumina fibers, whisker-like calcium carbonate, whisker-like boehmite, and the like. It is preferable to use wollastonite and whisker-like calcium carbonate that do not hinder bulk polymerization, and can improve the rigidity of the resulting molded product when added even in a small amount.

The 50% volume cumulative diameter of the particulate filler is preferably 0.1 to 50 μm, more preferably 1 to 30 μm, and particularly preferably 1 to 10 μm. If the 50% volume cumulative diameter of the particulate filler is too small, the resulting molded product may exhibit insufficient rigidity and dimensional stability. If the 50% volume cumulative diameter of the particulate filler is too large, the polymer solution may precipitate in the tank or the pipe, or the injection nozzle may be clogged when injecting the polymer solution into the mold.

Examples of the particulate filler include calcium carbonate, calcium hydroxide, calcium silicate, calcium sulfate, aluminum hydroxide, magnesium hydroxide, titanium oxide, zinc oxide, barium titanate, silica, alumina, carbon black, graphite, antimony oxide, red phosphorus, a metal powder, clay, a ferrite, hydrotalcite, and the like. It is preferable to use calcium carbonate and calcium hydroxide that do not hinder the bulk polymerization reaction.

It is preferable that the surface of the filler be hydrophobized. A situation in which the filler aggregates or precipitates in the liquid mixture can be prevented by utilizing the hydrophobized filler. It is also possible to uniformly disperse the filler in the resulting molded product, and ensure that the molded product exhibits uniform rigidity and dimensional stability, and has reduced anisotropy.

Examples of a hydrophobizing agent used for the hydrophobization treatment include a silane coupling agent (e.g., vinylsilane), a titanate coupling agent, an aluminum coupling agent, a fatty acid (e.g., stearic acid), oils and fats, a surfactant, wax, and the like.

The filler is preferably used in an amount of 5 to 55 parts by mass, and more preferably 10 to 45 parts by mass, based on 100 parts by mass of the norbornene-based monomer and the metathesis polymerization catalyst (b) in total. If the amount of the filler is too large, precipitation may occur in the tank or the pipe, or the injection nozzle may be clogged when injecting the reaction mixture into the mold. If the amount of the filler is too small, the resulting molded product may exhibit insufficient rigidity and dimensional stability.

The additional component may be added using a method that is appropriately selected taking account of the type of the additional component (additive), for example.

The reaction injection molding liquid mixture according to one embodiment of the invention is obtained by appropriately mixing the norbornene-based monomer, the metathesis polymerization catalyst (b), the activator (c), and the compound (d) optionally together with the additional component using a known method. The reaction injection molding liquid mixture according to one embodiment of the invention may be a one-liquid-type liquid mixture that includes the norbornene-based monomer, the metathesis polymerization catalyst (b), the activator (c), the compound (d), and the optional additional component, or may be a two-liquid-type liquid mixture that includes a liquid A that includes the activator (c), and a liquid B that includes the metathesis polymerization catalyst (b). It is preferable that the reaction injection molding liquid mixture according to one embodiment of the invention be the two-liquid-type liquid mixture from the viewpoint of suppressing polymerization reactivity, and ensuring excellent storage stability and an excellent handling capability.

In this case, the norbornene-based monomer and the compound (d) may respectively be included in either or both of the liquid A and the liquid B. When the reaction injection molding liquid mixture according to one embodiment of the invention includes the additional component, the additional component may be included in either or both of the liquid A and the liquid B.

When the reaction injection molding liquid mixture according to one embodiment of the invention is the two-liquid-type liquid mixture, the liquid A and the liquid B are separately prepared using different containers. The liquid A and the liquid B are mixed in an impingement mixing device, and injected into the mold in the form of a one-liquid-type liquid mixture when producing a reaction injection molded product.

2) Method for Producing Reaction Injection Molded Product

A method for producing a reaction injection molded product according to one embodiment of the invention includes a reaction injection molding step that includes subjecting the reaction injection molding liquid mixture according to one embodiment of the invention to bulk polymerization inside a mold.

More specifically, the method for producing a reaction injection molded product according to one embodiment of the invention includes separately (independently) injecting two or more formulations into an impingement mixing device, instantaneously mixing the formulations using a mixing head to obtain a liquid mixture (corresponding to the reaction injection molding liquid mixture (one-liquid-type liquid mixture) according to one embodiment of the invention), injecting the liquid mixture into a mold, and subjecting the liquid mixture to bulk polymerization inside the mold to produce a reaction injection molded product.

The two or more formulations may be prepared by appropriately providing (mixing) each component using a known method so that a reaction injection molding liquid mixture (one-liquid-type liquid mixture) having the desired composition is obtained when the two or more formulations are mixed. Typical examples of such a formulation include the liquid A and the liquid B that are used when the reaction injection molding liquid mixture according to one embodiment of the invention is the two-liquid-type liquid mixture. Note that only the norbornene-based monomer may be used as one of the formulations.

The method for producing a reaction injection molded product according to one embodiment of the invention is preferably implemented using the two-liquid-type liquid mixture as the reaction injection molding liquid mixture according to one embodiment of the invention since excellent production stability is achieved.

A reaction injection molding (RIM) device is not particularly limited. A known impingement mixing device may be used as the reaction injection molding device.

Note that a low-pressure injector such as a dynamic mixer or a static mixer may be used instead of an impingement mixing device.

The temperature of the formulation before being supplied to the reaction injection molding device is preferably 10 to 60° C. The viscosity (e.g., at 30° C.) of the formulation is normally about 5 to 3000 mPa·s and preferably about 50 to 1000 mPa·s.

The mold used for reaction injection molding is not particularly limited. A mold that includes a male mold and a female mold is normally used as the mold.

The mold may be formed of an arbitrary material. For example, the mold may be formed of a metal (e.g., steel, aluminum, zinc alloy, nickel, copper, and chromium), a resin, or the like. The mold may be produced by casting, forging, thermal spraying, electroforming, or the like. The mold may be plated.

The structure of the mold may be determined (selected) taking account of the pressure applied when injecting the liquid mixture into the mold. The mold clamping pressure (gauge pressure) is normally 0.1 to 9.8 MPa.

The molding time is determined (selected) taking account of the type and the amount of the norbornene-based monomer, the mold temperature, and the like, but is normally 5 seconds to 6 minutes, and preferably 10 seconds to 5 minutes.

For example, when a mold that includes a male mold and a female mold (that make a pair) is used, and the reaction injection molding liquid mixture is supplied to the cavity formed by the male mold and the female mold to carry out bulk polymerization in the cavity, it is normally preferable to set the temperature T1 (° C.) of the design surface-side mold to be higher than the temperature T2 (° C.) of the mold opposite to the design surface-side mold. This makes it possible to produce a molded product having a surface that has a beautiful external appearance and is free from a sink mark and air bubbles.

The value T1-T2 is preferably 5° C. or more, and more preferably 10° C. or more. The upper limit of the value T1-T2 is preferably 60° C. or less. The temperature T1 is preferably 110° C. or less, and more preferably 95° C. or less. The lower limit of the temperature T1 is preferably 50° C. or more. The temperature T2 is preferably 70° C. or less, and more preferably 60° C. or less. The lower limit of the temperature T2 is preferably 30° C. or more.

The mold temperature may be adjusted using a method that adjusts the mold temperature using a heater, or a method that adjusts the mold temperature using a heating medium (e.g., temperature-control water or oil) that is circulated through a pipe provided inside the mold, for example.

After producing a molded product as described above, a coating material (paint) may optionally be injected into the space formed by the molded product and the mold from a coating material inlet provided to the mold to form a coating material layer on the surface of the molded product (in-mold coating method) (see JP-A-2007-313395, for example).

After completion of bulk polymerization (or after completion of the in-mold coating process), the mold is opened, and the molded product is removed from the mold to obtain a reaction injection molded product.

3) Reaction Injection Molded Product

A reaction injection molded product according to one embodiment of the invention is obtained using the method for producing a reaction injection molded product according to one embodiment of the invention (see above). The reaction injection molded product according to one embodiment of the invention can be efficiently produced on an industrial production scale using the reaction injection molding liquid mixture according to one embodiment of the invention.

The reaction injection molded product according to one embodiment of the invention can be used directly. Note that the reaction injection molded product according to one embodiment of the invention may optionally be plated and/or painted (coated) using a known method in order to improve or maintain the properties of the molded product.

The reaction injection molded product according to one embodiment of the invention may suitably be used for automotive applications (e.g., bumper and air deflector); construction-industrial machine applications (e.g., wheel loader and power shovel); leisure applications (e.g., golf cart and game device); medical applications (e.g., medical equipment); industrial applications (e.g., large panel and chair); housing equipment applications (e.g., shower pan and lavatory bowl); and the like.

EXAMPLES

The invention is further described below by way of examples. Note that the invention is not limited to the following examples. The units "parts" and "%" used in connection with the examples respectively refer to "parts by mass" and "mass %" unless otherwise indicated. The properties were measured using the following methods.

(1) Flexural Strength

The flexural strength of the molded product was measured in accordance with JIS K 7171 at a temperature of 23° C.

(2) Flexural Modulus

The flexural modulus of the molded product was measured in accordance with JIS K 7171 at a rate of 2 mm/min.

(3) Resin Residue on Surface of Mold

After repeatedly producing ten molded products, the mold was cooled, and an arbitrary ten areas (10×10 mm) of the surface of the mold were observed using an optical microscope at a magnification of 10. The reaction injection molding liquid mixture was evaluated for the resin residue on the surface of the mold in accordance with the following standard.

Evaluation Standard

Very good: No resin residue was observed in any of the areas.

Good: A resin residue was observed in one or two areas.

Fair: A resin residue was observed in three to five areas.

Bad: A resin residue was observed in six or more areas.

Example 1

(1) Preparation of Liquid A 1.7 parts of dipropylene glycol dimethyl ether (compound (d)) and 4.1 parts of an ethylene-propylene copolymer (propylene unit: 89%, ethylene unit: 11%) (additional component (e)) were added to (mixed with) a norbornene-based monomer mixture (a) including 90 parts of dicyclopentadiene and 10 parts of tricyclopentadiene, followed by the addition of triethylaluminum (activator (c)) at a concentration of 22 mmol/kg to obtain a liquid A (formulation).

(2) Preparation of Liquid B 17 parts of tungsten hexachloride (metathesis polymerization catalyst (b)), 1 part of t-butanol, 14 parts of dodecylphenol, and 9 parts of acetylacetone were mixed in toluene to prepare a solution of the metathesis polymerization catalyst (b) (tungsten concentration: 11%).

4.1 parts of the ethylene-propylene copolymer (additional component (e)) was dissolved in the norbornene-based monomer mixture (a). The solution of the metathesis polymerization catalyst (b) was added to (mixed with) the resulting solution so that the concentration of the metathesis polymerization catalyst (b) was 7.6 mmol/kg to obtain a liquid B (formulation).

(3) A Two-Liquid-Type Reaction Injection Molding Liquid Mixture 1 Including the Liquid A and the Liquid B was Thus Obtained.

Example 2

(1) Preparation of Liquid A

A liquid A was prepared in the same manner as in Example 1, except that the activator (c) was added at a concentration of 13 mmol/kg, and the amount of the compound (d) was changed to 0.6 parts.

(2) Preparation of Liquid B

A liquid B was prepared in the same manner as in Example 1, except that 0.1 parts of the compound (d) was further added.

(3) A Two-Liquid-Type Reaction Injection Molding Liquid Mixture 2 Including the Liquid A and the Liquid B was Thus Obtained.

Examples 3 and 4

An RIM mold consisting of two aluminum sheets (that form an inner cavity having a length of 245 mm, a width of 210 mm, and a thickness of 3 mm) was provided, and heated to 90° C. The RIM mold had a structure in which one of the two aluminum sheets was provided with an inlet for injecting the reaction injection molding liquid mixture.

The liquid A and the liquid B of the reaction injection molding liquid mixture 1 obtained in Example 1, or the liquid A and the liquid B of the reaction injection molding liquid mixture 2 obtained in Example 2, were injected into the RIM mold while mixing the liquid A and the liquid B in a mixing ratio (mass ratio) of 1:1 using a static mixer, and subjected to bulk polymerization for 120 seconds. The mold was then opened, and the molded product was removed from the mold to obtain a molded product 1 (Example 3) or a molded product 2 (Example 4) formed of the norbornene-based resin (that had been polymerized and cured). Ten molded products were produced in each example. The resulting norbornene-based resins had a specific gravity of 1.04 and a glass transition temperature (Tg) (determined by DSC) of 145° C.

The flexural strength and the flexural modulus of an arbitrary five molded products among the ten molded products obtained in Example 3 and an arbitrary five molded products among the ten molded products obtained in Example 4 were measured, and the average values thereof were respectively calculated (see Table 1). Each reaction injection molding liquid mixture was evaluated as to the presence or absence of a resin residue on the surface of the mold as described above. The results are shown in Table 1.

TABLE 1

|  | Example 3 | Example 4 |
|---|---|---|
| Reaction injection molding liquid mixture | 1 | 2 |
| (compound (d)/activator (c)) | (4.5/1) | (3.5/1) |
| Flexural strength (MPa) | 76 | 74 |
| Flexural modulus (GPa) | 1.8 | 1.8 |
| Resin residue on surface of mold | Very good | Good |

As is clear from the results shown in Table 1, the resin did not remain on the surface of the mold when the molded product was removed from the mold, and a reaction injection molded product having an excellent surface and exhibiting excellent strength could be obtained by utilizing the reaction injection molding liquid mixture according to the embodiments of the invention including the activator (c) and the compound (d) in a specific ratio.

The invention claimed is:

1. A reaction injection molding liquid mixture comprising:
a norbornene-based monomer;
a metathesis polymerization catalyst that includes tungsten as a center metal;
an activator; and
an ether compound represented by a formula (1-1),

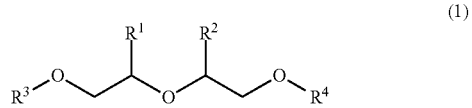

(1)

wherein $R^1$ and $R^2$ are independently an alkyl group having 1 to 6 carbon atoms,
the reaction injection molding liquid mixture comprising the activator and the ether compound in a molar ratio (ether compound/activator) of 1/1 to 10/1.

2. The reaction injection molding liquid mixture according to claim 1, wherein the ether compound represented by the formula (1) is dipropylene glycol dimethyl ether.

3. The reaction injection molding liquid mixture according to claim 1, wherein the reaction injection molding liquid mixture is a two-liquid-type liquid mixture that comprises a liquid A that comprises the activator, and a liquid B that comprises the metathesis polymerization catalyst that includes tungsten as the center metal, wherein the norbornene-based monomer and the ether compound represented by the formula (1) are included in either or both of the liquid A and the liquid B.

4. A method for producing a reaction injection molded product comprising a reaction injection molding step that includes subjecting the reaction injection molding liquid mixture according to claim 1 to bulk polymerization inside a mold.

5. A method for producing a reaction injection molded product comprising a reaction injection molding step that includes subjecting the reaction injection molding liquid mixture according to claim 2 to bulk polymerization inside a mold.

6. A method for producing a reaction injection molded product comprising a reaction injection molding step that includes subjecting the reaction injection molding liquid mixture according to claim 3 to bulk polymerization inside a mold.

\* \* \* \* \*